(12) United States Patent
Akahane et al.

(10) Patent No.: US 10,669,197 B2
(45) Date of Patent: Jun. 2, 2020

(54) SURFACE-MODIFIED GLASS FIBER FILM

(71) Applicant: SHIN-ETSU CHEMICAL CO., LTD., Tokyo (JP)

(72) Inventors: Saiko Akahane, Annaka (JP); Yoshihira Hamamoto, Takasaki (JP); Hideki Akiba, Annaka (JP); Shinsuke Yamaguchi, Annaka (JP); Toshio Shiobara, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 14/564,190

(22) Filed: Dec. 9, 2014

(65) Prior Publication Data

US 2015/0197885 A1    Jul. 16, 2015

(30) Foreign Application Priority Data

Jan. 14, 2014 (JP) .................................... 2014-4457

(51) Int. Cl.
*D06M 13/513* (2006.01)
*C03C 25/1095* (2018.01)
*C03C 25/50* (2006.01)

(52) U.S. Cl.
CPC .......... *C03C 25/1095* (2013.01); *C03C 25/50* (2013.01)

(58) Field of Classification Search
CPC .. D10B 2101/06; C03C 25/50; D06M 13/513; D06M 13/5135
USPC ............ 549/215; 556/410, 413, 482; 442/59
See application file for complete search history.

(56) References Cited

U.S. PATENT DOCUMENTS

| 4,056,651 A * | 11/1977 | Scola | C03C 25/26 |
| | | | 428/336 |
| 2002/0051882 A1* | 5/2002 | Lawton | B05C 1/06 |
| | | | 428/378 |
| 2002/0055313 A1* | 5/2002 | Velpari | C03C 25/48 |
| | | | 442/180 |

(Continued)

FOREIGN PATENT DOCUMENTS

| CN | 1546765 A | 11/2004 |
| CN | 102060448 A | 5/2011 |

(Continued)

OTHER PUBLICATIONS

Sep. 18, 2017 Office Action issued in Chinese Patent Application No. 201510016340.8.

(Continued)

*Primary Examiner* — Vincent Tatesure
(74) *Attorney, Agent, or Firm* — Oliff PLC

(57) ABSTRACT

The present invention provides a surface-modified glass fiber film having its surface modified by a silicon-containing compound, and a value of a common flexural rigidity of the surface-modified glass fiber film as measured by the method described in JIS R 3420 is in the range of 3 to 100 times as compared to a value of the common flexural rigidity of an unmodified glass fiber film.

There can be provided a surface-modified glass fiber film having a high strength, a high heat resistance, a good dimensional stability, a good self-supporting property, a low average linear expansion coefficient, a high storage rigidity at high temperature, and an excellent surface uniformity.

10 Claims, 3 Drawing Sheets

(56) References Cited

U.S. PATENT DOCUMENTS

| | | | | |
|---|---|---|---|---|
| 2010/0150791 A1* | 6/2010 | Kunze | ................... | C04B 41/009 |
| | | | | 422/179 |
| 2013/0177710 A1* | 7/2013 | Kim | ......................... | C08J 5/08 |
| | | | | 427/394 |
| 2013/0330989 A1 | 12/2013 | Im et al. | | |

FOREIGN PATENT DOCUMENTS

| | | | |
|---|---|---|---|
| CN | 102249556 | A | 11/2011 |
| CN | 103481608 | A | 1/2014 |
| JP | S63-005512 | B2 | 2/1988 |
| JP | S63-297249 | A | 12/1988 |
| JP | H02-89634 | A | 3/1990 |
| JP | A-8-259274 | | 10/1996 |
| JP | A-10-121363 | | 5/1998 |
| JP | B2-2844840 | | 1/1999 |
| JP | 2003-183982 | A | 7/2003 |
| JP | 2004-241481 | A | 8/2004 |
| JP | 2006-342445 | A | 12/2006 |
| JP | 2009-173472 | A | 8/2009 |
| JP | B2-4497977 | | 7/2010 |

OTHER PUBLICATIONS

Sep. 26, 2017 Office Action issued in Japanese Application No. 2015-004142.

Nov. 28, 2017 Office Action issued in Japanese Patent Application No. 2015-004142.

\* cited by examiner

SURFACE-MODIFIED GLASS FIBER FILM

BACKGROUND OF THE INVENTION

Field of the Invention

The present invention relates to a surface-modified glass fiber film.

Description of the Related Art

As the digital technologies advance remarkably, downsizing and functionalization of electronic appliances represented by a personal computer and a mobile phone are also advancing further. For example, for a printed wiring substrate which is a typical part thereof, a much higher density mounting technology and further downsizing are considered to be necessary. In order to meet these requirements, there is a strong demand on betterment of the characteristics of a glass fiber film which is an essential part of the printed wiring substrate. Under the current trend that is going on toward higher speed and higher frequency in a computer, a mobile phone, a communication infrastructure, and the like, the characteristics requested for the glass fiber film used in the printed wiring substrate is the suppressed transmission loss in a low dielectric material; and in addition, the material having characteristics of a low thermal expansion and a high tensile rigidity is requested as well. Moreover, in view of requirement for downsizing, there is a high demand on the development of a further thinner glass fiber film.

In addition, as a semiconductor package advances toward higher density in mounting, further downsizing, and higher functionalization, this trend being typically going on the semiconductor package for a mobile phone in recent years, the printed wiring substrate to be used therein is receiving further higher requirements. For example, in order to prevent warping of the package after mounting from occurring, the substrate material having a further lower linear expansion is requested. In order to meet this requirement, a laminated substrate having glass fibers impregnated with an organic resin composition that is filled with an inorganic filler at a high filling rate has been used. However, because the resin composition is highly viscous, the glass fibers undergo unfastening and twisting; and as a result, there are problems that uniformity of the substrate is damaged and the package is warped due to the inner shear stress.

Meanwhile, conventional technologies relating to the present invention may be exemplified by the following Patent Documents 1 to 4.

PRIOR ART DOCUMENTS

Patent Documents

Patent Document 1: Japanese Patent No. 2844840
Patent Document 2: Japanese Patent No. 4497977
Patent Document 3: Japanese Patent Laid-Open Publication No. H08-259274
Patent Document 4: Japanese Patent Laid-Open Publication No. H10-121363

SUMMARY OF THE INVENTION

The present invention was made in view of the situation as mentioned above, and thus, the present invention has an object to provide a surface-modified glass fiber film having a high strength, a high heat resistance, a good dimensional stability, a good self-supporting property, a low average linear expansion coefficient, a high storage rigidity at high temperature, and an excellent surface uniformity.

In order to achieve the object as mentioned above, the present invention provides a surface-modified glass fiber film, wherein the surface-modified glass fiber film has its surface modified by a silicon-containing compound, and a value of a common flexural rigidity of the surface-modified glass fiber film as measured by the method described in JIS R 3420 is in the range of 3 to 100 times as compared to a value of the common flexural rigidity of an unmodified glass fiber film.

The surface-modified glass fiber film like this can be provided with a high strength, a high heat resistance, a high electric insulation, a good size stability, a good self-supporting property, a low average linear expansion coefficient, a high storage rigidity at high temperature, a good oxygen barrier property, a good water vapor barrier property, and an excellent surface uniformity.

Among others, it is preferable that the surface-modified glass fiber film contain the silicon-containing compound that is used for the surface modification with the amount thereof being in the range of 2% or more and 90% or less by mass relative to 1001 by mass of the surface-modified glass fiber film and that part or whole of the glass fibers which constitute the glass fiber film be fastened by the surface modification.

The surface-modified glass fiber film like this can be provided with a good heat resistance, a good electric insulation, a good dimensional stability, a good self-supporting property, and a flexibility.

Further, it is preferable that the silicon-containing compound be one or more compounds selected from the group consisting of an alkoxy silane, a polysilazane, and a partially hydrolyzed condensation compound of them or a silicone-modified varnish.

Further, it is preferable that a linear expansion coefficient in the X-Y direction of the surface-modified glass fiber film be 20 ppm/° C. or less.

The surface-modified glass fiber film having the linear expansion coefficient like this can be suitably used for a printed substrate requiring high density mounting and downsizing.

Further, it is preferable that the surface-modified glass fiber film be the one whose glass transition temperature as measured by the method described in JIS C 6481 is not within the range of 250° C. or lower.

The surface-modified glass fiber film having the glass transition temperature Like this can be provided with further better heat resistance and electric insulation, so that it can be suitably used for a printed substrate requiring further downsizing and further higher density mounting.

The surface-modified glass fiber film according to the present invention can be provided with excellent properties in strength, electric insulation, heat resistance, dimensional stability, discoloration resistance, weatherability, and flexibility, along with a low average linear expansion coefficient. In addition, because this has not only a high storage rigidity at high temperature but also excellent oxygen barrier property, water vapor barrier property, and surface uniformity, the surface-modified glass fiber film free from the problems such as poor thermal characteristics, and because of a poor mechanical strength, necessity of a separate support when mounting a heavy part, these being problematic in existing flexible substrates, can be obtained. That is, the surface-modified glass fiber film according to the present invention can provide an excellent flexible substrate.

In addition, because the surface-modified glass fiber film according to the present invention has the glass fibers fastened in part or as a whole, the glass fibers do not undergo unfastening or twisting when the film is used as the material for a laminated substrate; and thus, the uniformity of the laminated substrate obtained therefrom is so high that there is no convergence of a shear stress at high temperature, whereby the laminated substrate having excellent dimensional stability even at high temperature can be provided.

DETAILED DESCRIPTION OF THE PREFERRED EMBODIMENTS

Figure 1:
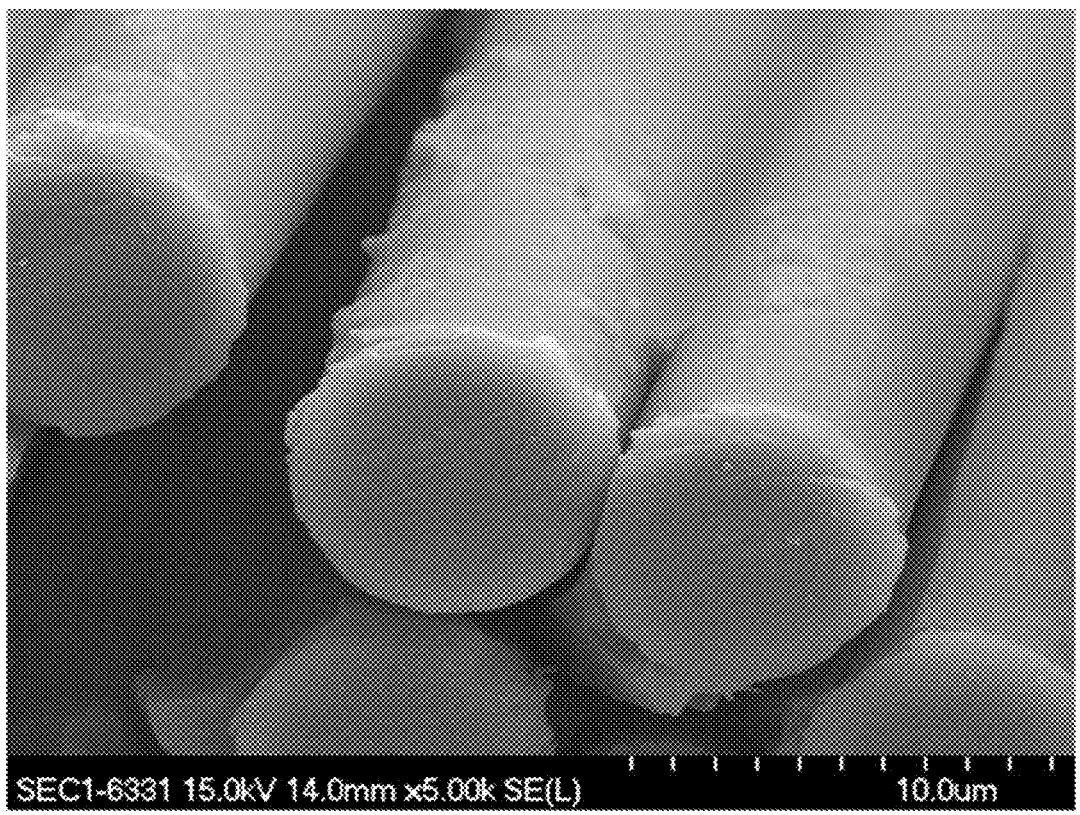
FIG. 1 is the electron microscopic picture of the surface-modified glass fiber film (the glass fibers with 87 μm) obtained in Example 5.

Hereunder, the present invention will be explained in detail; however, the present invention is not limited to them.

The present invention is a surface-modified glass fiber film, wherein the surface-modified glass fiber film has its surface modified by a silicon-containing compound, and a value of a common flexural rigidity of the surface-modified glass fiber film as measured by the method described in JIS R 3420 is in the range of 3 to 100 times as compared to a value of the common flexural rigidity of an unmodified glass fiber film (hereinafter, this is referred to as glass cloth).

This value of the common flexural rigidity is a value measured by the method described in JIS R 3420, wherein this number of the times is used as the indicator to show the degree of the change from the state of a so-called "cloth" to the state of a so-called "film", the change being caused by surface-modification of the glass cloth. In the surface-modified glass fiber film of the present invention, this number of the times of the common flexural rigidity is in the range of 3 to 100 times, preferably in the range of 5 to 60 times, or more preferably in the range of 10 to 50 times, as compared to the measured value of the glass cloth.

If this number of the times is less than 3, the dimensional stability and fixing effect of the glass fibers as expected by the present invention cannot be obtained, that is, the effects to prevent twisting and unfastening from occurring can hardly be obtained; and in addition, the electric insulation, the heat resistance, the oxygen barrier property, the water vapor barrier property, the weatherability, and the like, owing to the siloxane characteristics, are insufficient. If the number of the times is more than 100, the flexural rigidity becomes so hard that cracks are generated and flexibility as the flexible substrate is lost.

In order to have further better conditions in such characteristics as the electric insulation, the heat resistance, the weatherability, the dimensional stability, and the flexibility, amount of the silicon-containing compound in the glass cloth is preferably in the range of 2% or more and 90% or less by mass, more preferably in the range of 5% or more and 70% or less by mass, or still more preferably in the range of 10 or more and 60% or less by mass, relative to 100% by mass of the glass fiber film obtained after the surface modification.

If the amount is 2% or more by mass, the characteristics such as the electric insulation, the heat resistance, the weatherability, the dimensional stability, and the self-supporting property can be enhanced, and thus it is preferred. If the amount is 90% or less by mass, the electric insulation, the dimensional stability, and the like can be obtained without lowering the heat resistance and deteriorating the flexibility, and thus it is preferred.

The glass cloth to be used in the present invention is preferably formed of glass fibers in the form of filaments; and this may be fabric-opened by a columnar stream or a water stream with a high frequency vibration method. The glass fibers to be used in the present invention may be any glasses including the E glass, the A glass, the 0 glass, and the 5 glass. In view of the cost and the availability, the E glass, which is for a general purpose, is preferable; however, the quartz glass is preferable in the case that further higher characteristics are required (for example, a lower dielectric constant, a higher heat resistance, a lower contamination by impurities, and the like).

The weaving density of the fibers of the glass cloth is preferably in the range of 10 to 200 yarns per 25 mm, or more preferably in the range of 15 to 100 yarns per 25 mm; and the mass thereof is preferably in the range of 5 to 400 $g/m^2$, or more preferably in the range of 10 to 300 $g/m^2$. Within these ranges, the surface-modified glass fiber film of the present invention can readily have the functional effects as described in the present application.

Any weaving method including the plain weaving method, the sateen weaving method, the twill weaving method, and the basket weaving method may be used without particular restrictions. In addition, the glass cloth that is woven by using the glass fibers in which one of them is processed to be textured or the both may be used. The glass cloth with the 3-spindle braided fabric can provide the surface-modified glass fiber film with a further higher strength and reliability.

Alternatively, the woven fabric having an unwoven cloth or long fibers orientated in one direction may also be used.

When the surface modification by the silicon-containing compound is executed, it is preferable to remove a bundling agent in advance, if this agent is applied to the glass cloth.

In the present invention, depending on the properties required, the woven cloth that is obtained by mixing the afore-mentioned glass fiber with the fibers including inorganic fibers such as carbon fibers and ceramic fibers, boron fibers, metal fibers such as steel fibers and tungsten fibers, and new type heat resistant fibers such as aramid fibers and phenol fibers may be used as the glass cloth.

As to the silicon-containing compound to be used for the glass cloth thereby obtaining the surface-modified glass fiber film of the present invention, one or more compounds selected from the group consisting of an alkoxy silane, a polysilazane, and a partially hydrolyzed condensation compound of them or a silicon-modified varnish.

Illustrative example of the alkoxy silane includes tetraalkoxy silanes such as tetramethoxy silane and tetraethoxy silane; alkyl alkoxy silanes such as trimethyl methoxy silane, trimethyl ethoxy silane, dimethyl dimethoxy silane, dimethyl diethoxy silane, methyl trimethoxy silane, methyl triethoxy silane, n-propyl triethoxy silane, hexyl trimethoxy silane, octyl triethoxy silane, decyl trimethoxy silane, and 1,6-bis(trimethoxysilyl) hexane; aryl alkoxy silanes such as methyl phenyl dimethoxy silane, methyl phenyl diethoxy silane, diphenyl dimethoxy silane, diphenyl diethoxy silane, phenyl trimethoxy silane, phenyl triethoxy silane, and p-styryl trimethoxy silane; hydroxy alkoxy silanes such as hydroxy trimethoxy silane and hydroxy triethoxy silane; alkenyl alkoxy silanes such as vinyl trimethoxy silane and vinyl triethoxy silane; epoxy group-containing alkoxy silanes such as 3-glycidoxypropyl trimethoxy silane, 3-glycidoxypropyl methyl dimethoxy silane, 3-glycidoxypropyl triethoxy silane, 3-glycidoxypropyl methyl diethoxy silane, and 2-(3,4-epoxycyclohexyl)ethyl trimethoxy silane; (meth) acryl group-containing alkoxy silanes such as 3-methacryloxypropyl trimethoxy silane, 3-methacryloxypropyl methyl dimethoxy silane, 3-methacryloxypropyl triethoxy silane, 3-methacryloxypropyl methyl diethoxy silane, and 3-acryloxypropyl trimethoxy silane; amino group-containing alkoxy silanes such as N-2-(aminoethyl) 3-aminopropyl trimethoxy silane, N-2-(aminoethyl) 3-aminopropyl methyl dimethoxy silane, 3-aminopropyl trimethoxy silane, 3-aminopropyl triethoxy silane, N-phenyl-3-aminopropyl trimethoxy silane, 3-allylaminopropyl trimethoxy silane, N-(N-vinylbenzyl)-2-aminoethyl-3-aminopropyl trimethoxy silane and its hydrochloride salt, and N-(N-vinylbenzyl)-2-aminoethyl-3-aminopropyl methyl dimethoxy silane and its hydrochloride salt; isocyanate alkoxy silanes such as 3-isocyanatepropyl triethoxy silane and tris-(trimethoxysilylpropyl) isocyanurate; and alkoxy silane compounds such as 3-ureidopropyl triethoxy silane, 3-chloropropyl trimethoxy silane, 3-mercaptopropyl trimethoxy silane, 3-mercaptopropyl methyl dimethoxy silane, and bis (trisethoxysilylpropyl)tetrasulfide. These alkoxy silanes may be used solely or as a mixture of two or more of them. However, the alkoxy silanes are not limited to the above-mentioned alkoxy silanes.

Illustrative example of the polysilazane includes 1,1,3,3-tetramethyl disilazane, hexamethyl disilazane, 1,3-divinyl, 1,1,3,3-tetramethyl disilazane, and 1,1,3,3,5,5-hexamethyl cyclotrisilazane, although not limited to them.

Illustrative example of the silicone-modified varnish to be used includes various silicone-modified varnishes such as an alkyd-modified varnish, a polyester-modified varnish, an epoxy-modified varnish, and acryl-modified varnish, wherein an appropriate one may be chosen arbitrarily in accordance with the final use and aim.

As to the preferable silicon-containing compound, alkoxy silanes may be mentioned. Among them, particularly preferable alkoxy silanes are selected from the type generally known as silane coupling agents, that is, methyl trimethoxy silane and those alkoxy silanes having functional groups. Illustrative example of the silane coupling agent includes vinyl trimethoxy silane, 3-glycidoxypropyl trimethoxy silane, and 3-aminopropyl trimethoxy silane.

A partially hydrolyzed condensation compound of an alkoxy silane is also a preferable silicon-containing compound. Especially, an alkoxy silane oligomer having both a functional group and an alkoxy silyl group, the oligomer being obtained by partial hydrolysis condensation reaction of the foregoing silane coupling agents, may be the preferable silicon-containing compound. Specific example thereof includes X-41-1059A (epoxy group-containing alkoxy silane oligomer; manufactured by Shin-Etsu Chemical Co., Ltd.) and X-40-2651 (amino group-containing alkoxy silane oligomer; manufactured by Shin-Etsu Chemical Co., Ltd.).

The linear expansion coefficient in the X-Y direction of the surface-modified glass fiber film of the present invention is preferably 20 ppm/C or less, or more preferably 1.5 ppm/° C. or less. Illustrative example of the measurement method of the linear expansion coefficient in the X-Y direction is as follows. A sample is cut out to give a specimen having the width of 3 mm, the length of 25 mm, and the thickness of 50 to 300 sun, which is then subjected to the tensile test with the load of 100 mN, the temperature ascending rate of 5° C./minute from −60° C. to 200° C. by using the thermal mechanical analysis (TMA) instrument. If the linear expansion coefficient is 20 ppm/° C. or less, namely, if it has a low linear expansion coefficient, requirements for higher mounting density and downsizing in the printed substrate may be fulfilled. In addition, this may be used in the aerospace field in which it is used under extremely severe conditions and the transportation field as the heat-resistant electric insulation film.

Meanwhile, the linear expansion coefficient of a polyether imide film, a generally used highly heat resistant engineering plastic film, is about 50 ppm/° C. On the other hand, if the surface-modified glass fiber film of the present invention has the linear expansion coefficient as mentioned above, the film having both the excellent heat resistance and the low linear expansion coefficient may be provided.

It is preferable that the surface-modified glass fiber film of the present invention be the one whose glass transition temperature as measured by the method described in JIS C 6481 is not within the range 250° C. or lower; more preferably the glass transition temperature thereof is not within the range 300° C. or lower, or particularly preferably, there is no measurable glass transition temperature. If there is no glass transition temperature at the temperature of 250° C. or lower, a substrate having the excellent heat resistance and suppressed warping at high temperature may be obtained; and thus, requirements of the high density mounting and downsizing in the printed substrate may be fulfilled, so that the glass fiber film having further higher heat resistance and more excellent electric insulation may be provided.

The method for manufacturing the surface-modified glass fiber film of the present invention is not particularly restricted, so that a generally used method for modification of glass fibers may be used. For example, generally used application methods (coating methods) to glass fibers may be exemplified. Typical example of the coating method includes the direct gravure coater method, the chamber doctor coater method, the offset gravure coater method, the one-roll kiss coater method, the reverse kiss coater method, the bar coater method, the reverse roll coater method, the slot die method, the air doctor coater method, the normal rotation roll coater method, the blade coater method, the knife coater method, the dip coater method, the MB coater method, and the MB reverse coater method. Among them, the direct gravure coater method, the offset coater method, and the dip coater method are preferable in manufacturing of the surface-modified glass fiber film of the present invention.

Although the condition is different depending on the silicon-containing compound to be used, for example, drying after coating, and heat treatment is executed to cure it in the temperature range of room temperature to 300° C. and for the period of 1 minute to 24 hours. In this method, in view of productivity, cost, and workability, the surface-modified glass fiber film of the present invention may be produced by the heat treatment done preferably in the temperature range of 100 to 250° C. and for the period of 3 minutes to 4 hours, or more preferably in the temperature range of 150 to 230° C. and for the period of 5 minutes to 1 hour.

The coating solution to be used in the above-mentioned coating method is the one which is obtained by diluting the silicon-containing compound in a solvent. The solvent may be exemplified by water or organic solvents used singly or as a mixture of two or more of them. Illustrative example of the organic solvent includes alcohols such as methanol, ethanol, isopropanol, and n-butanol; ketones such as acetone, methyl ethyl ketone, and methyl isobutyl ketone; glycol ethers of ethylene glycol, propylene glycol, and the like; aliphatic hydrocarbons such as hexane and heptane; aromatic hydrocarbons such as toluene and xylene; and ethers such as diethyl ether, diisopropyl ether, and di(n-butyl) ether. To this diluted solution may be further added pH controlling agents including organic acids such as formic acid, acetic acid, propionic acid, and oxalic acid, as well as an aqueous ammonia solution; a pigment, a filler, a surfactant, a thickener, and the like may added as well.

In addition, a condensation catalyst of the alkoxy group may also be added. Illustrative example thereof includes organometallic compounds such as an organic tin compound, an organic titanium compound, and an organic bismuth compound as well as an amine compound.

The organometallic condensation catalyst may be exemplified by metallic Lewis acids. Illustrative example thereof includes organic tin compounds such as dibutyltin dimethoxide, dibutyltin diacetate, dibutyltin dioctoate, dibutyltin dilaurate, dibutyltin bis(acetylacetonato), dibutyltin bis(benzylmaleate), dimethyltin dimethoxide, dimethyltin diacetate, dioctyltin dioctoate, dioctyltin dilaurate, stannous dioctoate, and stannous dilaurate; organic titanium compounds such as tetraisopropyl titanate, tetra(n-butyl) titanate, tetra(t-butyl) titanate, tetra(n-propyl) titanate, tetra-2-ethylhexyl titanate, diisopropyl di-t-butyl titanate, dimethoxy titanium bisacetylacetonato, diisopropoxy titanium bisethylacetoacetate, di(t-butoxy) titanium bisethylacetoacetate, and di(t-butoxy) titanate bismethylacetoacetate; and organic bismuth compounds such as bismuth tris(2-ethylhexanoate) and bismuth tris(neodecanoate); and these may be used solely or as a combination of two or more of them.

Specific example of the amine compound includes hexyl amine, di-2-ethyl hexyl amine, N,N-dimethyl dodecyl amine, di-n-hexyl amine, dicyclohexyl amine, di-n-octyl amine, and hexamethoxy methyl melamine.

Among these condensation catalysts, the organic titanium compounds are particularly preferable.

As to the coating solution, in considering the effect to the environment in coating, an aqueous coating solution is preferred. The amino group-containing silane coupling agents (for example, KBM-903; manufactured by Shin-Etsu Chemical. Co., Ltd.) are the preferable silicon-containing compounds, because they have excellent stability and solubility in an aqueous system.

The surface-modified glass fiber film produced in the way as mentioned above is surface-modified by the silicon-containing compound; and thus, it has excellent heat stability, electric insulation, dimensional stability, discoloration resistance, light resistance, and weatherability. Moreover, it has the self-supporting characteristic, which property is lacking in the unmodified glass fibers, and in addition, the fibers are fixed; and as a result, the uniform and homogeneous glass fiber film that is free from the problems of twisting and unfastening of the glass fibers during the time of filling with a resin may be obtained. Besides, because of these characteristics, this can be used not only as a resin plate by itself but also as the reinforcing substrate of a prepreg. In addition, by laminating or plating a metal such as copper on its surface, a metal, clad laminated substrate which is usable in the LED-mounted substrate may be obtained.

The surface-modified glass fiber film of the present invention may find possible applications, in addition to the above-mentioned applications, as the material for sport and leisure goods such as a tennis racket, a golf shaft, a baseball bat, and a fishing rod by utilizing the rigidity of the glass fibers. Moreover, the surface-modified glass fiber film of the present invention may be expected to be used various fields in various ways as the reinforcing material for an air plane, a space rocket, and the like; as the light-weight, high rigidity, and high strength material in the transportation fields including an automobile, a bicycle, and a water vehicle; as a bullet proof vest by utilizing the light-weight, high-strength, and flame retardant properties; and in the civil engineering field as the maintenance material of infrastructures such as strengthening of a bridge pier by utilizing the high-strength, high durability, and good weatherability properties.

EXAMPLES

Hereunder, the present invention will be explained specifically by showing Examples and Comparative Examples; however, the present invention is not restricted by the following Examples.

Example 1

The glass cloth (used yarn: E250 with density of 59 warp yarns per 25 mm, 57 weft yarns per 25 mm, thickness of 87 µm, and mass of 95 g/m$^2$) was soaked in, as the silicon-containing compound, methyl trimethoxy silane (trade name of KBM-13; manufactured by Shin-Etsu Chemical Co., Ltd.), and then it was dried by heating at 100° C. for 20 minutes. Thereafter, it was subjected to the heat treatments at 100° C. for 1 hour and then at 200° C. for 1 hour to obtain the glass fiber film. Amount of the silicon-containing compound is shown in Table 1. The modified glass fiber film thus obtained was subjected to the following measurements.
Mechanical Properties:
Following mechanical properties of the modified glass fiber film thus obtained were measured.
1. Common Flexural Rigidity
The measurement was done by the method described in JIS R 3420 (general test method of glass fibers). The value measured in the direction of the warp yarns was used. The results are shown in Table 1.
2. Linear Expansion Coefficient
The sample of the modified glass fiber film thus obtained was cut out to give a specimen having the width of 3 mm, the length of 25 mm, and the thickness of 50 to 300 mm, which was then subjected to the tensile test with the load of 100 mN and the temperature ascending rate of 5° C./minute from −60° C. to 200° C. by using the thermal mechanical analysis (TMA) instrument (instrument name of TMA/SS6000; manufactured by Seiko instruments Inc.). The linear expansion coefficient was measured from the elongated amount of the modified glass fiber film against the temperature.
3. Glass Transition Temperature
The sample of the modified glass fiber film thus obtained was cut out to give a specimen having the width of 4 to 6 mm, the length of 30 to 40 mm, and the thickness of 50 to 300 mm, which was then subjected to the measurement of the glass transition temperature in the parallel direction with the film (direction of the X-Y axis) in the temperature range of 100 to 300° C. by using the dynamic viscoelasticity measurement instrument (instrument name of Q800; manufactured by TA instruments Inc.) in accordance with the method described in JIS C 6481. When the glass transition temperature was observed in the afore-mentioned range, this value is shown in Table 1. When the glass transition temperature was not observed in the afore-mentioned range, it is described as "undetected".

Example 2

The procedure of Example 1 was repeated, except that 3-glycidoxypropyl trimethoxy silane (trade name of KBM-403; manufactured by Shin-Etsu Chemical Co., Ltd.) was used as the silicon-containing compound in place of methyl trimethoxy silane, to obtain the glass fiber film. The evaluation method of Example 1 was followed to obtain the results as shown in Table 1.

Example 3

The procedure of Example 1 was repeated, except that vinyl trimethoxy silane (trade name of KBM-1003; manufactured by Shin-Etsu Chemical Co., Ltd.) was used as the silicon-containing compound in place of methyl trimethoxy silane, to obtain the glass fiber film. The evaluation method of Example 1 was followed to obtain the results as shown in Table 1.

Example 4

The procedure of Example 1 was repeated, except that aqueous solution of 32% by mass of the aminosilane coupling agent (trade name of KBP-90; manufactured by Shin-Etsu Chemical Co., Ltd.) was used as the silicon-containing compound in place of methyl trimethoxy silane, to obtain the glass fiber film. The evaluation method of Example 1 was followed to obtain the results as shown in Table 1.

Example 5

The procedure of Example 1 was repeated, except that 3-aminopropyl trimethoxy silane (trade name of KBM-903; manufactured by Shin-Etsu Chemical Co., Ltd.) was used as the silicon-containing compound in place of methyl trimethoxy silane, to obtain the glass fiber film. The evaluation method of Example 1 was followed to obtain the results as shown in Table 1.

Example 6

The procedure of Example 1 was repeated, except that the coating solution of 50 g of the epoxy group-containing organoalkoxy silane oligomer (trade name of X-41-1059A; manufactured by Shin-Etsu Chemical Co., Ltd.) diluted by 50 g toluene was used as the silicon-containing compound in place of methyl trimethoxy silane, to obtain the glass fiber film. The evaluation method of Example 1 was followed to obtain the results as shown in Table 1.

Example 7

The procedure of Example 1 was repeated, except that the coating solution of 50 g of the amino group-containing organoalkoxy silane oligomer (trade name of X-40-2651; manufactured by Shin-Etsu Chemical Co., Ltd.) diluted by 50 g toluene was used as the silicon-containing compound in place of methyl trimethoxy silane, to obtain the glass fiber film. The evaluation method of Example 1 was followed to obtain the results as shown in Table 1.

Example 8

The coating solution was prepared by adding 2 parts by mass of hydrophilic fumed silica (trade name of Aerosil 200; manufactured by Nippon Aerosil. Co., Ltd.) as the viscosity adjusting agent to 100 parts by mass of 3-aminopropyl trimethoxy silane (trade name of KBM-903; manufactured by Shin-Etsu Chemical Co., Ltd.) as the silicon-containing compound in place of methyl trimethoxy silane. The procedure of Example 1 was repeated by using this coating solution to obtain the glass fiber film. The evaluation method of Example 1 was followed to obtain the results as shown in Table 1.

Example 9

The procedure of Example 6 was repeated, except that the glass cloth whose thickness was different from that of Example 6, namely the glass cloth (used yarn: 0450 with density of 53 warp yarns per 25 mm, 53 weft yarns per 25 mm, thickness of 42 pmt, and mass of 47 g/m$^2$), was used, to obtain the glass fiber film. The evaluation method of Example 1 was followed to obtain the results as shown in Table 1.

Example 10

The procedure of Example 5 was repeated, except that the glass cloth whose thickness was different from that of Example 5, namely the glass cloth (used yarn: D450 with density of 53 warp yarns per 25 mm, 53 weft yarns per 25 mm, thickness of 42 μm, and mass of 47 g/m$^2$), was used, to obtain the glass fiber film. The evaluation method of Example 1 was followed to obtain the results as shown in Table 1.

Comparative Example 1

The coating solution was prepared by adding 5 g of 3-glycidoxypropyl trimethoxy silane (trade name of KBM-403; manufactured by Shin-Etsu Chemical Co., Ltd.) to 95 g of toluene. The procedure of Example 1 was repeated by using this coating solution to obtain the glass fiber film. The evaluation method of Example 1 was followed to obtain the results as shown in Table 1.

Comparative Example 2

The coating solution was prepared by adding 0.5 parts by mass of 3-glycidoxypropyl trimethoxy silane (trade name of KBM-403; manufactured by Shin-Etsu Chemical Co., Ltd.), 0.02 parts by mass of polyoxyethylene octyl phenyl ether with HLB of 13.6 as the surfactant, and 0.05 parts by mass of acetic acid to 100 parts by mass of water. The procedure of Example 1 was repeated by using this coating solution to obtain the glass fiber film. The evaluation method of Example 1 was followed to obtain the results as shown in Table 1.

Comparative Example 3

The procedure of Comparative Example 2 was repeated, except that 0.5% by mass of 3-aminopropyl trimethoxy silane (trade name of KBM-903; manufactured by Shin-Etsu Chemical Co., Ltd.) was used in place of 3-glycidoxypropyl trimethoxy silane, to obtain the glass fiber film. Thereafter, the evaluation of the obtained film was done by the same method as that of Example 1. The evaluation results are shown in Table 1.

Comparative Example 4

The procedure of Comparative Example 2 was repeated, except that 0.5% by mass of vinyl trimethoxy silane (trade name of KBM-1003; manufactured by Shin-Etsu Chemical Co., Ltd.) was used in place of 3-glycidoxypropyl trimethoxy silane, to obtain the glass fiber film. Thereafter, the evaluation of the obtained film was done by the same method as that of Example 1. The evaluation results are shown in Table 1.

Comparative Example 5

3-Glycidoxypropyl trimethoxy silane (trade name of KBM-403; manufactured by Shin-Etsu Chemical Co., Ltd.)

and mass of 95 g/m$^2$); and then, they were dried by heating at 100° C. for 10 minutes. The attached amount of the silicon-containing compound was 93% by mass, but the common flexural rigidity was more than 100 times as compared to that of the unmodified glass cloth, whereby causing a large crack on the surface-modified glass film, so that the measurements to be followed thereafter could not be carried out.

TABLE 1

| Silicon-containing compound | Effective amount (% by mass) | Thickness of glass cloth (μm) | Common flexural rigidity ratio*1 | Attached amount (% by mass) | Linear expansion coefficient (ppm/° C.) | Glass transition temperature (° C.) |
|---|---|---|---|---|---|---|
| Example | | | | | | |
| 1. KBM-13 | 100 | 87 | 4.4 | 5.6 | 7 | Undetected |
| 2. KBM-403 | 100 | 87 | 6.3 | 4.5 | 8 | Undetected |
| 3. KBM-1003 | 100 | 87 | 5.5 | 5.1 | 8 | Undetected |
| 4. KBP-90 | 32 | 87 | 10.4 | 2.8 | 7 | Undetected |
| 5. KBM-903 | 100 | 87 | 21.9 | 18.2 | 8 | Undetected |
| 6. X-41-1059A | 50 | 87 | 15.5 | 32.8 | 11 | Undetected |
| 7. X-40-2651 | | | | | | |
| 8. KBM-903 + Aerosil 200 | 50 100 | 87 87 | 32.6 42.7 | 35.8 58.3 | 11 10 | Undetected 290 |
| 9. X-41-1059A | 50 | 42 | 29.5 | 58.5 | 13 | 280 |
| 10. KBM-903 | 100 | 42 | 14.4 | 38.9 | 9 | Undetected |
| Comparative Example | | | | | | |
| 1. KBM-403 dilute solution | 5 | 87 | 1.3 | 0.2 | 6 | Undetected |
| 2. KBM-403 coating solution | 0.5 | 87 | 1.7 | 0.05 | 6 | Undetected |
| 3. KBM-903 coating solution | 0.5 | 87 | 1.5 | 0.1 | 6 | Undetected |
| 4. KBM-1003 coating solution | 0.5 | 87 | 1.1 | 0.08 | 6 | Undetected |
| 5. KBM-403 | 100 | 87 | >100 | 92.0 | Unmeasurable | Unmeasurable |
| 6. KBM-903 | 100 | 87 | >100 | 93.0 | Unmeasurable | Unmeasurable |

*1Common flexural rigidity ratio = (common flexural rigidity of the surface-modified glass fiber film cloth)/(common flexural rigidity of the unmodified glass fiber cloth)

was added in a Teflon-coated (trade name) frame with the size of 200 mm×240 mm×3 mm, and then into it was disposed the glass cloth (used yarn: E250 with density of 59 warp yarns per 25 mm, 57 weft yarns per 25 mm, thickness of 87 μm, and mass of 95 g/m$^2$); and then, they were dried by heating at 100° C. for 10 minutes. The attached amount of the silicon-containing compound was 92% by mass, but the common flexural rigidity was more than 100 times as compared to that of the unmodified glass cloth, whereby causing a large crack on the surface-modified glass film, so that the measurements to be followed thereafter could not be carried out.

Comparative Example 6

3-Aminopropyl trimethoxy silane (trade name of KBM-903; manufactured by Shin-Etsu Chemical Co., Ltd.) was added in a Teflon-coated (trade name) frame with the size of 200 mm×240 mm×3 mm, and then into it was disposed the glass cloth (used yarn: E250 with density of 59 warp yarns per 25 mm, 57 weft yarns per 25 mm, thickness of 87 μm, 4. Test of Change in the Form By using the surface-modified glass fiber films prepared in Example 4, Example 5, Example 10, Comparative Example 1, and Comparative Example 3, the unmodified glass cloth (used yarn: E250 with density of 59 warp yarns per 25 mm, 5 weft yarns per 25 mm, thickness of 87 μm, and mass of 95 g/m$^2$; Comparative Example 7), and the surface-modified glass fiber films prepared in Comparative Examples 1 and 3, the following comparative evaluation tests of the respective films were carried out.

In advance, the slurry of the epoxy resin composition with a high filler content was prepared, comprising 10 parts by mass of the cresol novolak epoxy resin (trade name of EPICRON N-695; manufactured by DIC Corp.), 5 parts by mass of the phenol novolak resin (trade name of PHENO-LITE TD-2090; manufactured by DIC Corp.), 0.1 parts by mass of the imidazole catalyst (trade name of 1B2PZ; manufactured by Shikoku Chemicals Corp.), 85 parts by mass of the spherical silica (trade name of SC-2050-SE; manufactured by Admatechs Co., Ltd.), and 50 parts by mass of MEK solvent.

After each of the surface-modified glass fiber film or the glass cloth was soaked in the slurry of the above-mentioned epoxy resin composition with a high filler content, they were dried at 100° C. for 10 minutes, set in a metallic mold, and then pressed at 200° C. with the pressure of 2 MPa for the period of 70 minutes. The change in the form of the film or the glass cloth was visually checked with regard to unfastening and twisting. These results are shown in Table 2.

TABLE 2

|  | Example 4 | Example 5 | Example 10 | Comparative Example 1 | Comparative Example 3 |
|---|---|---|---|---|---|
| Change in the form*2 | Good | Good | Good | Not good | Not good |

*2Change in the form:
Good: Fastened
Not good: Unfastened and twisted

Figure 2:
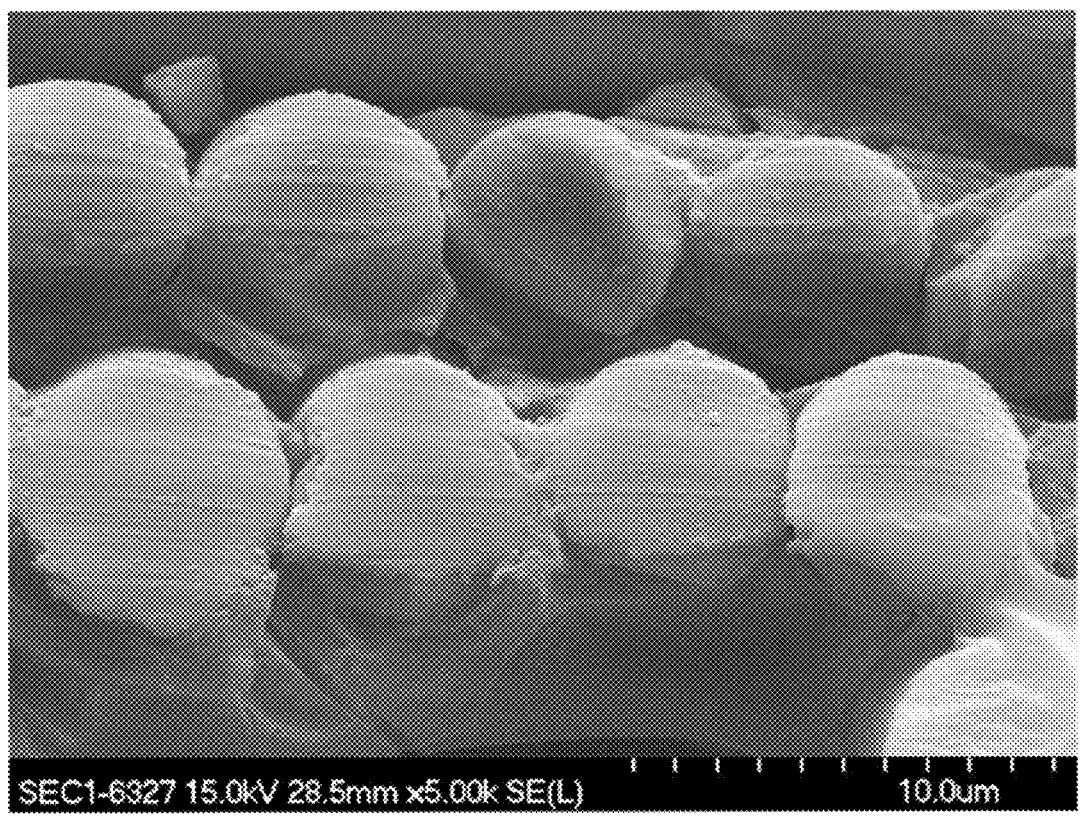
FIG. 2 is the electron microscopic picture of the surface-modified glass fiber film (the glass fibers with 42 μm) obtained in Example 10.

The respective pictures of the cross section of the surface-modified glass fiber film of Example 5 and of Example 10 taken by the electron microscope (TMS) are shown in FIG. 1 and FIG. 2, respectively. As can be seen from these pictures, it is clear that the glass fibers are fastened by themselves by the cured silicon-containing compound.

Example 11

Two sheets of the surface-modified glass fiber film obtained in Example 1 were adhered with each other by the addition-type silicon resin adhesive (trade name of KE-109; manufactured by Shin-Etsu Chemical Co., Ltd.), press-molded at 150° C. with the pressure of 2 MPa for the period of 30 minutes by using a hot press machine, and then secondarily cured at 150° C. for 1 hour to obtain the laminated substrate. Following evaluations were carried out with regard to the obtained laminated substrate. The evaluation results are shown in Table 3.
5. Appearance The surface of the obtained laminated substrate was visually observed to confirm whether or not the cloth was unfastened or twisted.
6. Heat Resistance The obtained laminated substrate was subjected to the IR reflow treatment at 260° C. for 60 seconds by using the IR reflow instrument (instrument name of TNR15-225LH; manufactured by Tamura Corp.), and then, the change in color of the surface thereof was visually observed.

Example 12

The procedure of Example 11 was repeated by using the modified glass fiber film obtained in Example 3 to obtain the laminated substrate. The appearance and the heat resistance thereof were evaluated by following the procedure of Example 11. The obtained results are shown in Table 3.

Example 13

The procedure of Example 11 was repeated by using the modified glass fiber film obtained in Example 6 to obtain the laminated substrate. The appearance and the heat resistance thereof were evaluated by following the procedure of Example 11. The obtained results are shown in Table 3.

Comparative Example 7

The unmodified glass cloth (used yarn: E250 with density of 59 warp yarns per 25 mm, 57 weft yarns per 25 mm, thickness of 87 μm, and mass of 95 g/m²) was soaked in the slurry solution of the epoxy resin composition comprising 10 parts by mass of the cresol novolak epoxy resin (product name of EPICRON N-695; manufactured by DIC Corp.), 5 parts by mass of the phenol novolak resin (product name of PHENOLITE TD-2090; manufactured by DIC Corp.), 0.1 parts by mass of the imidazole catalyst (product name of 2E4MZ; manufactured by Shikoku Chemicals Corp.), 85 parts by mass of the spherical silica (product name of SC-2050-SE; manufactured by Admatechs Co., Ltd.), and 50 parts by mass of MEK solvent; and then, they were dried at 100° C. for 10 minutes to obtain the epoxy resin-impregnated glass cloth in the uncured state. Four sheets of the obtained epoxy resin-impregnated glass cloth in the uncured state were press-molded at 150° C. with the pressure of 2 MPa for the period of 30 minutes by using a hot press machine, and then secondarily cured at 150° C. for 1 hour to obtain the laminated substrate. Evaluations of the appearance and the heat resistance thereof were carried out with regard to the obtained laminated substrate by following the procedure of Example 11. The evaluation results are shown in Table 3.

TABLE 3

|  | Example 11 | Example 12 | Example 13 | Comparative Example 7 |
|---|---|---|---|---|
| Change in the form*3 | Good | Good | Good | Not good |
| Change in color | No | No | No | Yes |

*3Change in the form:
Good: Fastened
Not good: Unfastened or twisted, or both

It can be seen from the results shown in Table 3 that because the modified glass fiber films of the present invention are used in the laminated substrates of Examples 11 to 13, the substrates having less change in the form during press molding while having excellent dimensional stability can be provided, contrary to the conventional glass cloth that is treated by the silane coupling agent. In addition, because the laminated substrates in Examples 11 to 13 are obtained without containing the epoxy resin and so forth, the laminated substrate with depressed change in color, this change in color being problematic in conventional glass epoxy substrates, can be obtained as well.

Example 14

Figure 3:
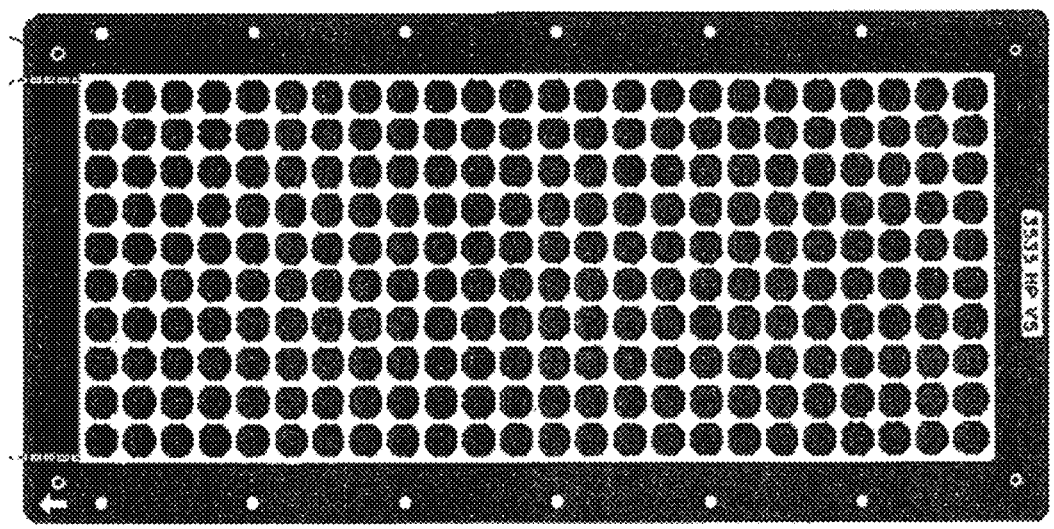
FIG. 3 is the top view of the substrate obtained in Example 14.

A sheet of the modified glass fiber film obtained in Example 2 was soaked in the phenyl silicone resin varnish (containing 100 parts by mass of phenyl silicone resin, 5 parts by mass of titanium oxide (trade name of CR-95; manufactured by Ishihara Sangyo Kaisha, Ltd.), and 200 parts by mass of alumina (trade name of AO-502; manufactured by Admatechs Co., Ltd.)), and then, it was dried to obtain the silicone prepreg. On both sides of one sheet of the obtained prepreg were disposed copper foils (thickness of 18 μm; manufactured by Fukuda Metal. Foil & Powder Co., Ltd.). This was press molded at 150° C. for 30 minutes by using a hot press machine, which was then secondarily cured at 150° C. for 1 hour to obtain the laminated substrate. By using the obtained laminated substrate, the substrate having the form shown in FIG. 3 was obtained. The obtained substrate was subjected to the IR reflow treatment (maximum temperature of 260° C.) for three times; and then the degree of warping in the longitudinal direction (unit: mm) was measured. The result of it is shown in Table 4.

Comparative Example 8

The procedure of Example 14 was repeated, except that the unmodified glass cloth (used yarn: E250 with density of 59 warp yarns per 25 mm, 57 weft yarns per 25 mm, thickness of 87 μm, and mass of 95 g/m²) was used in place of the glass fiber film used in Example 14, to obtain the substrate. The evaluation result of it is shown in Table 4.

TABLE 4

|  | Example 14 | Comparative Example 8 |
|---|---|---|
| Warping of the substrate in the longitudinal direction (mm) | 2 | 9 |

From the results shown in Table 4, in Comparative Example 8, because of the large CTE, which has been problematic in conventional silicone-containing glass substrate, the glass fibers are unfastened and twisted therein; and as a result, the warping is generated at high temperature. On the other hand, if the surface-modified glass fibers of the present invention is used, because of the remarkably low CTE, the laminated substrate not having the glass fibers unfastened or untwisted can be obtained; and as a result, in the substrate itself, the twisting and warping can be suppressed due to the shear stress therein, so that it becomes clear that this can be used as the material having high reliability at high temperature.

It must be noted here that the present invention is not limited to the embodiments as described above. The foregoing embodiments are mere examples; any form having substantially the same composition as the technical concept described in claims of the present invention and showing similar effects is included in the technical scope of the present invention.

What is claimed is:

1. A prepreg comprising a surface-modified glass fiber film in a resin matrix, wherein:
    the surface-modified glass fiber film is a film that includes (i) a cloth including a plurality of glass fibers and (ii) a cured film formed on the glass fibers and consisting of a silicon-containing compound only, the cured film being formed by coating the cloth with a liquid composition consisting of the silicon-containing compound and optionally a solvent, and then curing the liquid composition,
    the glass fibers are fastened to each other by the silicon-containing compound,
    a common flexural rigidity ratio of the surface-modified glass fiber film is in the range of 3 to 100,
    an amount of the silicon-containing compound in the surface-modified glass fiber film is in the range of 2% or more and 90% or less by mass relative to 100% by mass of the surface-modified glass fiber film, and
    the silicon-containing compound is selected from the group consisting of an alkoxy silane, a polysilazane, and a partially hydrolyzed condensation compound of them.

2. The prepreg according to claim 1, wherein a linear expansion coefficient in the X-Y direction of the surface-modified glass fiber film is 20 ppm/° C. or less.

3. The prepreg according to claim 1, wherein the surface-modified glass fiber film is one whose glass transition temperature as measured by the method described in JIS C 6481 is not within the range of 250° C. or lower.

4. The prepreg according to claim 2, wherein the surface-modified glass fiber film is one whose glass transition temperature as measured by the method described in JIS C 6481 is not within the range of 250° C. or lower.

5. The prepreg according to claim 1, wherein the amount of the silicon-containing compound in the surface-modified glass fiber film is in the range of 16.2% or more and 90% or less by mass relative to 100% by mass of the surface-modified glass fiber film.

6. The prepreg according to claim 1, wherein the silicon-containing compound is an alkoxy silane.

7. A printed substrate comprising a cured product of the prepreg according to claim 1.

8. The prepreg according to claim 1, wherein the liquid composition is a coating solution consisting of the silicon-containing compound dissolved in a solvent.

9. The prepreg according to claim 1, wherein the coating solution is an aqueous coating solution.

10. The prepreg according to claim 1, wherein the liquid composition consists of the silicon-containing compound.

* * * * *